United States Patent [19]

Yamanaka et al.

[11] Patent Number: 4,742,866
[45] Date of Patent: May 10, 1988

[54] HEAT EXCHANGER

[75] Inventors: Yasutoshi Yamanaka; Teruo Izumida; Kazuya Nomura, all of Kariya, Japan

[73] Assignee: Nippondenso Co., Ltd., Kariya, Japan

[21] Appl. No.: 878,296

[22] Filed: Jun. 23, 1986

[30] Foreign Application Priority Data

Jun. 25, 1985 [JP] Japan .................. 60-138252

[51] Int. Cl.⁴ .............................................. F28F 3/04
[52] U.S. Cl. .................................... 165/38; 165/167; 165/916
[58] Field of Search .......................... 165/38, 167, 916

[56] References Cited

U.S. PATENT DOCUMENTS

| | | | |
|---|---|---|---|
| 2,511,084 | 6/1950 | Shaw | 165/167 |
| 2,677,531 | 5/1954 | Hock et al. | 165/167 |
| 3,743,011 | 7/1973 | Frost | 165/38 |
| 3,754,706 | 8/1973 | Tao | 165/38 X |
| 4,360,055 | 11/1982 | Frost | 165/38 |
| 4,561,494 | 12/1985 | Frost | 165/167 |
| 4,580,625 | 4/1986 | Yamanaka et al. | 165/167 |
| 4,638,856 | 1/1987 | Yamanaka et al. | 165/167 |

FOREIGN PATENT DOCUMENTS

| | | | |
|---|---|---|---|
| 0124217 | 11/1984 | European Pat. Off. | 165/167 |
| 571706 | 2/1933 | Fed. Rep. of Germany | 165/167 |
| 2521279 | 4/1975 | Fed. Rep. of Germany | 165/167 |
| 2729202 | 3/1978 | Fed. Rep. of Germany | 165/167 |
| 2323119 | 1/1977 | France | 165/167 |
| 2052722 | 1/1981 | United Kingdom | 165/167 |

Primary Examiner—Albert W. Davis, Jr.
Assistant Examiner—Peggy Neils
Attorney, Agent, or Firm—Cushman, Darby & Cushman

[57] ABSTRACT

A cooler for engine lubricant oil is formed by a stack of heat exchanger modules each defining therein a first space for engine cooling water. A second space is defined between each adjacent pair of modules. The first spaces in respective modules are communicated with each other by water inlets and outlets. The second spaces are communicated with each other by openings. One of the outermost modules is sealingly connected to a part of a lubricant circuit of the engine while the other outermost module is sealingly connected with an oil filter so that hot lubricant oil from the engine flows through the second spaces in the stack of modules into the oil filter in heat exchange relationship with engine cooling water flowing through the first spaces in respective modules. The oil filter is communicated with another part of lubricant circuit for the recirculation of cleaned oil back into the engine.

9 Claims, 7 Drawing Sheets

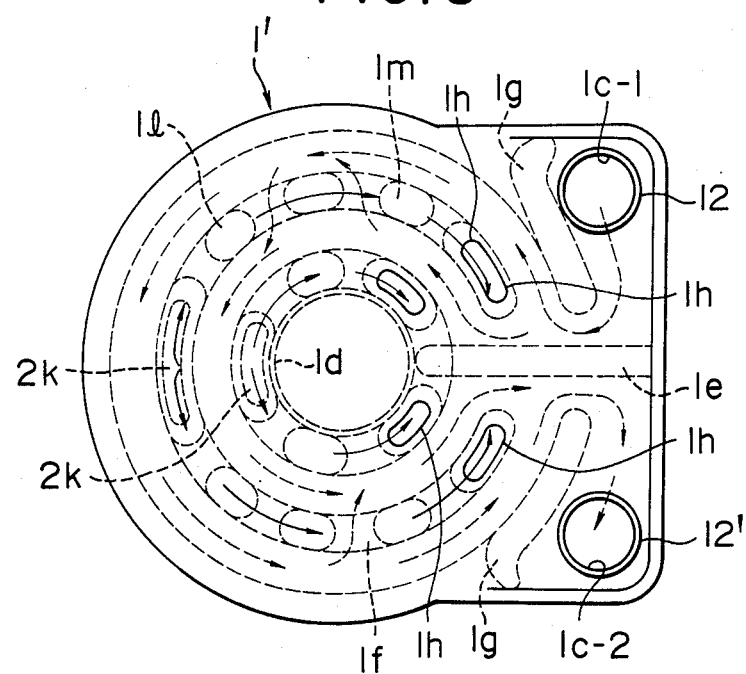
FIG. 8
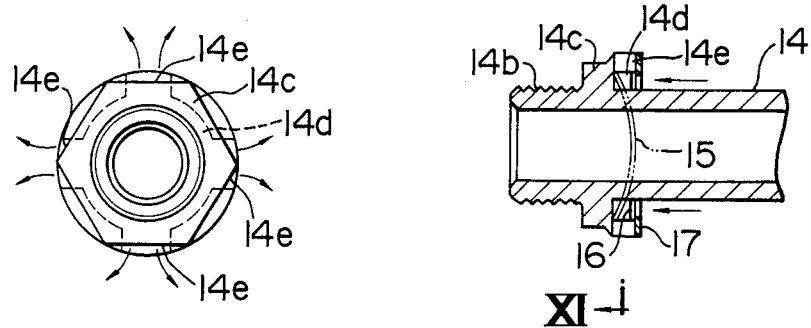
FIG. 9
FIG. 10

HEAT EXCHANGER

BACKGROUND OF THE INVENTION

The present invention relates to a heat exchanger which can be used, for example, as a cooler mounted on an internal combustion engine to exchange heats of engine lubricant oil and engine cooling water to cool the lubricant oil.

DESCRIPTION OF THE PRIOR ART

Japanese Utility Model Publication No. 59-28219 (28219/84) published Aug. 15, 1984 discloses an oil cooler designed to be disposed between an engine block and an oil filter to exchange the heats of engine lubricant oil and engine cooling water to thereby cool the lubricant oil before the oil from the engine enters the oil filter. In order to improve the heat exchange efficiency, the oil cooler is provided with inner fins which, however, cause disadvantageous problems that deposits are formed in the oil cooler between the fins and, in addition, resistance to the flow of the fluids through the oil cooler is increased to adversely affect the operative life of the cooler.

The present invention aims at eliminating the above problems and providing a heat exchanger which is improved to reduce the formation of deposits as well as to decrease the resistance to the flows of the fluids through the heat exchanger and which can be manufactured at a reduced cost.

SUMMARY OF THE INVENTION

The heat exchanger according to the present invention comprises a stack of a plurality of generally planar heat exchanger modules each comprising first and second generally planar plates of a good heat conductive material. Each of the first and second plates of each module includes an outer peripheral zone raised from a general plane of the plate. The first and second plates of each module are sealingly secured together along their outer peripheral zones. The adjacent plates of each adjacent pair of modules have portions disposed radially inwardly of the outer peripheral zones of the plates and sealingly secured together. The plates of the modules are shaped such that a first space for a first heat exchange fluid is defined in each module and such that a second space for a second heat exchange fluid is defined between the adjacent plates of each adjacent pair of modules. Each module is provided with inlet and outlet for the first fluid. The inlets of the modules are connected with each other for fluid-flow communication with the first spaces in the modules while the outlets of the modules are connected with each other for fluid-flow communication with the first spaces in the modules. The first and second plates of each module have ridges projecting toward each other from the opposite inner surfaces of the first space in the module to cooperate to define a passage for the flow of the first fluid in the first space from the inlet to the outlet.

The above and other objects, features and advatages of the invention will be made more apparent by the following description with reference to the accompanying drawings.

BRIEF DESCRIPTION OF THE DRAWINGS

FIG. 8 diagrammatically illustrates the flows of heat exchanging fluids in the heat exchanger;

FIG. 9 is a top plan view of a hollow bolt for securing the heat exchanger to an engine block in fluid flow communication therewith;

FIG. 10 is a fragmentary axial sectional view of the bolt;

DESCRIPTION OF PREFERRED EMBODIMENTS

Figure 1:
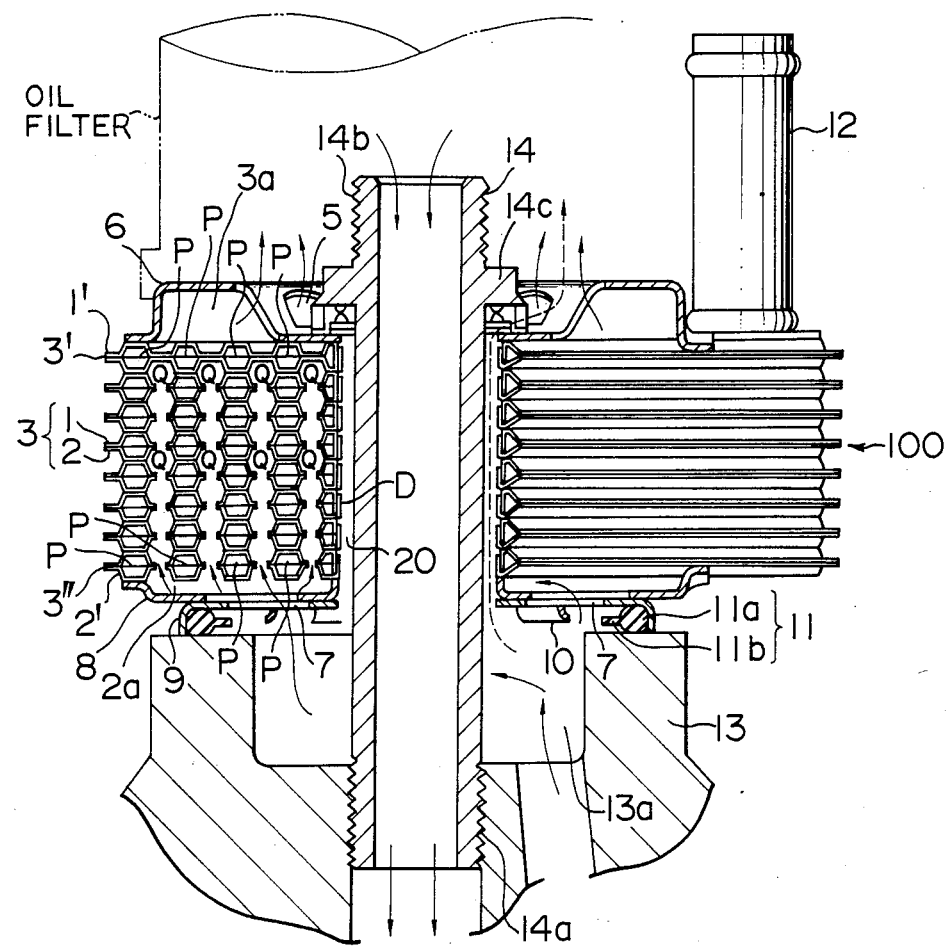
FIG. 1 is a partly sectional side elevation of an embodiment of the heat exchanger according to the present invention.

Referring to FIGS. 1-6 of the drawings, an engine oil cooler embodying the present invention is generally designated by reference numeral 100 and shown as being sealingly secured at one end to an engine block 13 by means of a hollow bolt 14 to be described in detail later. The other end of the oil cooler 100 is designed to sealingly and detachably receive thereon an oil filter shown by two dot lines in FIG. 1.

The oil cooler 100 includes a stack of a plurality of heat exchanger modules 3, the uppermost and lowermost modules being designated by 3' and 3", respectively. Each of the modules 3 is formed by upper and lower plates 1 and 2 both formed from a material having a good heat conductive characteristic, such as a stainless steel. The upper and lower plates 1 and 2 have substantially identical shapes, as will be seen from the following description.

The plates 1 and 2 are preferably prepared by stamping sheets of a metal. Thus, ridges on one surface of a plate 1 or 2 provide elongated grooves in the other surface of the plate and vice versa.

Figure 2:
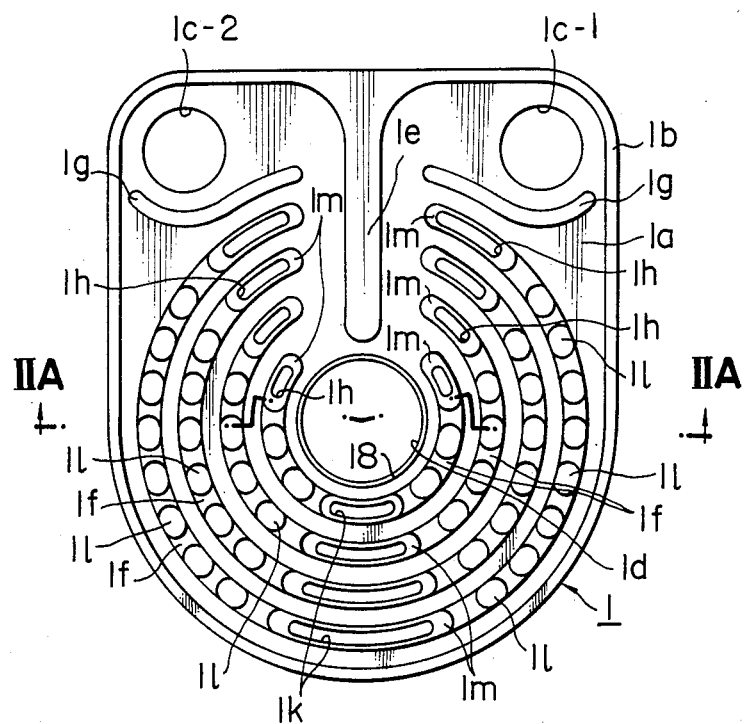
FIG. 2 is a bottom plan view of an upper plate of one of a plurality of heat exchanger modules of the heat exchanger shown in FIG. 1.
Figure 3:
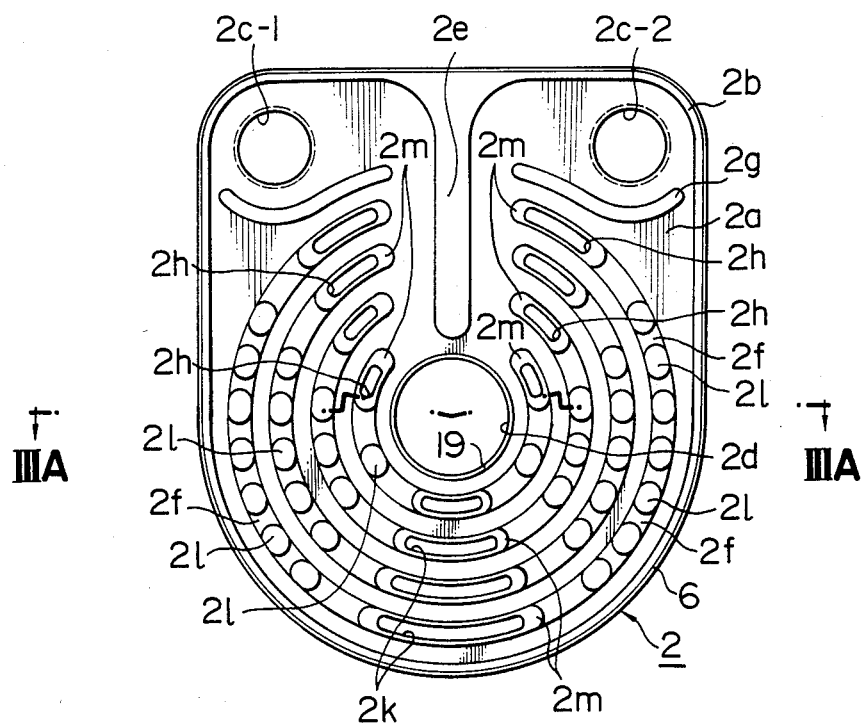
FIG. 3 is a plan view of a lower plate of the module.
Figure 3A:
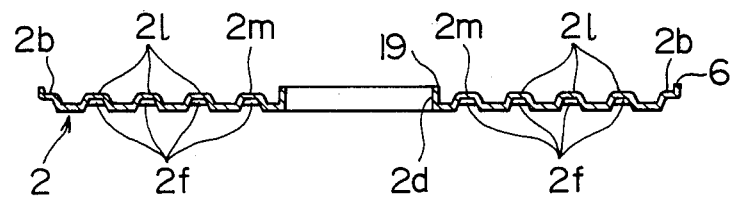
FIG. 3A is a sectional view of the lower plate taken along line IIIA—IIIA in FIG. 3.

Referring particularly to FIGS. 2-3A, the upper and lower plates 1 and 2 of each module 3 are both of a tongue-like shape, as shown in FIGS. 2 and 3, and are each arcuate at one end and square at the other end. The plates 1 and 2 have outer peripheral edge zones 1b and 2b, respectively, which are raised from generally planar plate sections 1a and 2a, respectively. The plates 1 and 2 are provided with first and second circular openings 1c-1 and 1c-2 and 2c-1 and 2c-2, respectively, formed in their plate sections 1a and 2a adjacent to the opposite corners in the said other end of each of the plates 1 and 2. The lower plate 2 is provided with annular flanges or collars formed along the peripheral edges of the circular openings 2c-1 and 2c-2, as shown by broken lines in FIG. 3. These collars each have an outer diameter substantially equal to or slightly smaller than the inner diameter of each of the circular openings 1c-1 and 1c-2 in the upper plate 1 for the reason to be made apparent later.

The plates 1 and 2 are formed therein with central circular openings 1d and 2d, respectively. The central openings 1d and 2d are positioned such that the centers of these central openings coincide with the centers of the arcs of the said one ends of the plates 1 and 2, respectively. The central openings 1d and 2d are greater than the first and second openings 1c-1, 1c-2, 2c-1 and 2c-2. Annular flanges or collars 18 and 19 are formed along the inner peripheral edges of the central openings 1d and 2d, respectively, as will be best seen in FIGS. 2A and 3A. These collars 18 and 19 are dimensioned such that the inner diameter of the collar 18 of the upper plate 1 is substantially equal to the outer diameter of the collar 19 of the lower plate 2 so that, when both plates 1 and 2 are assembled together, the collar 19 is snugly received in the central openings 1d in the upper plate 1, as will be understood from the illustration in FIG. 4.

In the plate sections 1a and 2a of the plates 1 and 2, there are formed longitudinal ridges 1e and 2e each disposed between the first and second openings 1c-1 and 1c-2 or 2c-1 and 2c-2 and extending from the said other end of each plate almost to the central hole 1d or 2d, as will be seen in FIGS. 2 and 3.

Figure 4:
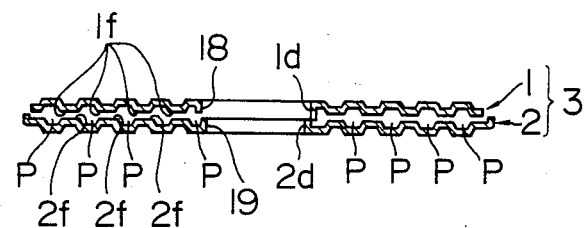
FIG. 4 illustrates, in sectional view, one of the heat exchanger modules with the upper and lower plates thereof shown in slightly spaced relationship.

The plates 1 and 2 are further formed thereon with a plurality of generally C-shaped circumferential ridges 1f and 2f arranged around the central openings 1d and 2d, respectively, and disposed in substantially concentric relationship with respect to each other. The C-shaped ridges 1f and 2f each have opposite ends disposed on the opposite sides of the longitudinal ridge 1e or 2e and spaced therefrom, as shown in FIGS. 2 and 3. The C-shaped ridges 1f and 2f have substantially the same width, namely, the dimension as measured in the radial direction of the axis of the central opening 1d or 2d. In addition, the radial spaces between the C-shaped ridges 1f on the plate 1 are substantially the same as those between the ridges 2f on the plate 2. Thus, it will be appreciated that, when the two plates 1 and 2 are assembled together in face-to-face contacting relationship, the ridges 1e and 1f on the upper plate 1 are respectively aligned with the ridges 2e and 2f on the lower plate 2 as shown in FIG. 4.

Figure 2A:
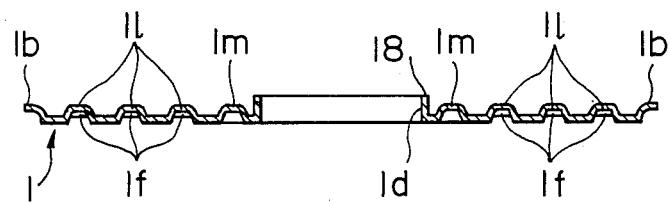
FIG. 2A is a sectional view of the upper plate taken along line IIA—IIA in FIG. 2.
Figure 4A:
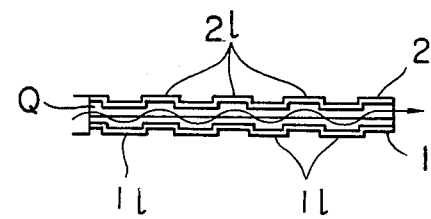
FIG. 4A schematically illustrates a zig-zag flow of oil in a space defined between an adjacent pair of modules.

Each of the C-shaped ridges 1f and 2f is raised at portions adjacent to the opposite ends and in the intermediate portion of the ridge, as indicated by numeral 1m (FIG. 2) and 2m (FIG. 3) to provide abutments which, when the two plates are assembled, abut with each other. For this purpose, the abutments 1m and 2m have planar tops, as shown in FIGS. 2A and 3A. Each of the C-shaped ridges 1f and 2f is further provided with a plurality of circumferentially spaced projections 1l or 2l disposed between the abutments 1m or 2m. The projections 1l and 2l are arranged such that, when the upper and lower plates 1 and 2 are assembled together, the projections 1l on the upper plate 1 are staggered relative to the projections 2l on the lower plate 2, as shown in FIG. 4A.

Referring back to FIGS. 2 and 3, the upper and lower plates 1 and 2 are each further provided with a pair of generally laterally elongated and slightly curved ridges 1g or 2g formed in the plate section 1a or 2a on the opposite sides of the longitudinal ridge 1e or 2e and arranged such that the curved portions of the ridges 1g or 2g are substantially parallel to the peripheral edges of the first and second openings 1c-1 and 1c-2 or 2c-1 and 2c-2, respectively.

The lower plate 2 is further provided with a peripheral flange 6 formed along the outer peripheral edge of the peripheral edge zone 2b and projecting upright therefrom, as shown in FIG. 3A.

The outer peripheral zone 1b, the longitudinal ridge 1e, the abutments 1m on the circumferential ridges 1f, and the laterally elongated ridges 1g, all of which are formed on the upper plate 1, have planar top faces extending in the same plane, while the corresponding portions 1b, 2e, 2m and 2g on the lower plate 2 have planar top faces extending in the same plane, so that, when the two plates 1 and 2 are assembled together, the top faces are disposed in face-to-face engagement with each other.

The abutments 1m and 2m on the opposite end portions of the C-shaped circumferential ridges 1f and 2f of the plates 1 and 2 are formed therein with circumferentially elongated slots or third openings 1h and 2h, while the abutments 1m and 2m in the intermediate portions of the circumferential ridges 1f and 2f are formed therein with circumferentially elongated arcuate fourth openings or slots 1k and 2k, as will be seen in FIGS. 2 and 3. The circumferential dimention of the arcuate slot 1k or 2k in an abutment 1m or 2m on a circumfernetial ridge 1f or 2f on the plate 1 or 2 is greater than the circumfernetial dimension of the arcuate slot 1k or 2k in a radially inner circumferential ridge 1f or 2f. In other words, the circumferential dimensions of the fourth openings 1k or 2k are increased radially outwardly of the axis of the central openings 1d or 2d.

The upper and lower plates 1 and 2 of each of the modules 3 are assembled such that the outer peripheral zones 1b and 2b, the longitudinal ridges 1e and 2e, the abutments 1m and 2m on the circumferential ridges 1f and 2f and the laterally elongated ridges 1g and 2g are aligned with each other such that the circular collars 18 and 19 are engaged with each other and such that layers of a brazing material are disposed between the aligned and engaged portions of the upper and lower plates 1 and 2. The slots 1h in the upper plate 1 are aligned with the slots 2h in the lower plate 2, while the arcuate slots 1k in the upper plate 1 are aligned with the arcuate slots 2k in the lower plate 2.

It is particularly pointed out that the upper and lower plates of the uppermost and lowermost modules 3' and 3" are designated by numerals 1' and 2', respectively, and also have structures described above with the exceptions that the upper plate 1' of the uppermost module 3' is not provided with the circumferentially elongated slots 1k, namely, the fourth openings, and that the lower plate 2' of the lowermost module 3" is not provided with the first, second and third openings 2c-1, 2c-2 and 2h. The upper and lower plates 1 and 2 of each of the uppermost and lowermost modules 3' and 3" are similarly assembled.

The modules 3, 3' and 3" are then stacked as shown in FIG. 1 with layers of the brazing material interposed therebetween.

Figure 5:
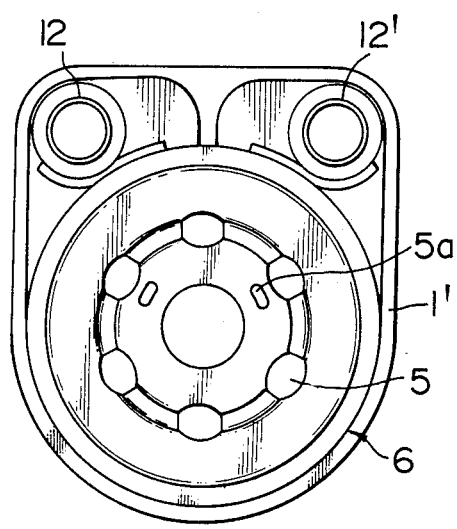
FIG. 5 is a top plan view of the heat exchanger shown in FIG. 1.
Figure 6:
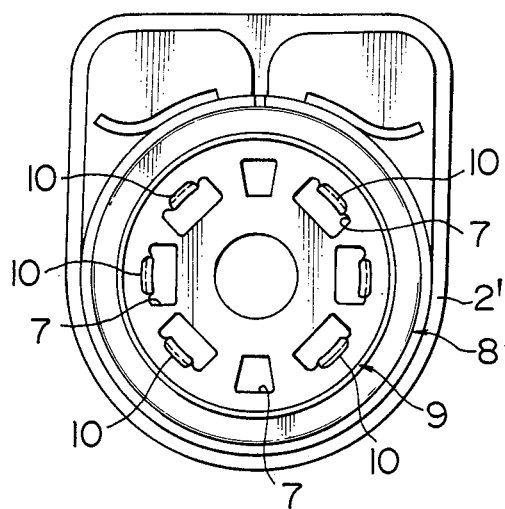
FIG. 6 is a bottom view of the heat exchanger shown in FIG. 1.

An annular end plate 6, having a generally U-shaped section and provided with circumferentially spaced outlets ports 5, is placed on the upper surface of the upper plate 1' of the uppermost module 3', as shown in FIGS. 1 and 5, with a layer of the brazing material interposed between the end plate 6 and the uppermost module. An annular chamber 3a is defined between the plates 1' and 6. Similarly, an annular lower end plate 8 formed therein with circumferentially spaced inlet ports 7 is placed on the bottom face of the lower plate 2' of the lowermost module 3", as shown in FIGS. 1 and 6, with a layer of the brazing material interposed therebetween. An annular chamber 2a is defined between the plates 2' and 8. The lower end plate 8 carries an annular seal-retainer member 9 secured to the botom face of the end plate 8. The seal-retainer member 9 is positioned coaxially with the end plate 8 and formed therein with a circumferentially spaced inlet openings aligned with the openings 7 in the lower end plate 8. The member 9 has a circumferentially spaced and downwardly extending tabs 10 formed along the radially outer sides of the openings aligned with the inlet ports 7. These tabs 10 cooperate with a circular flange section of the seal-retainer member 9 to retain an annular seal member 11 formed of a ring 11a of a circular section and a lip 11b extending radially inwardly from the ring 11a, as will be seen in FIG. 1.

The component parts of the oil cooler 100, which are assembled in the manner shown in FIG. 1, excepting the seal 11, are placed in a heated vacuum furnace in which the layers of the brazing material between the component parts of the assembly are fused to sealingly secure them together to complete the oil cooler. Thereafter, the seal 11 is attached to the seal-retainer member 9 and held in position by the tabs 10.

Figure 7:
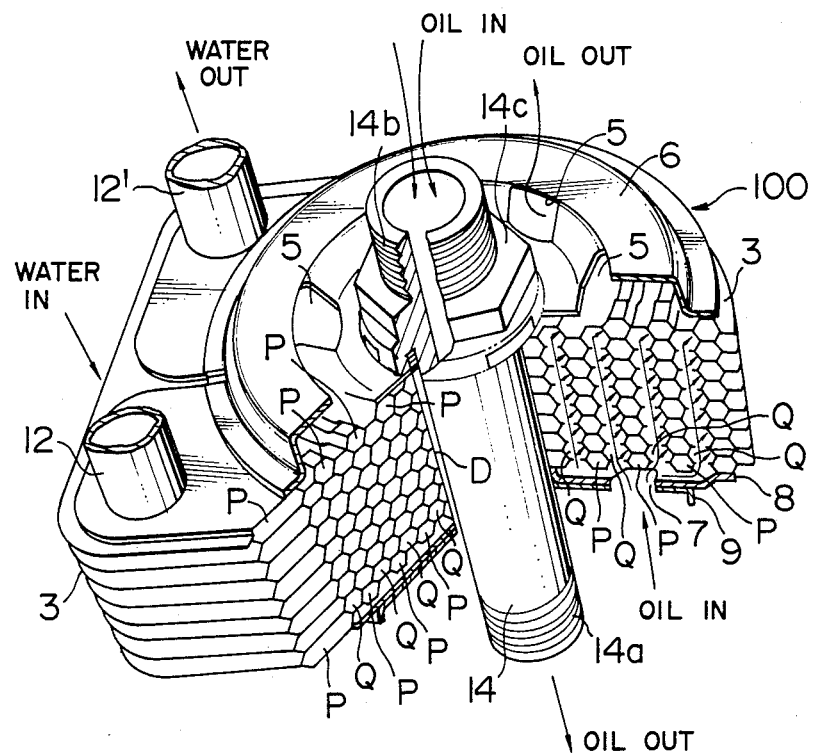
FIG. 7 is a perspective view of the heat exchanger shown in FIG. 1 with a part thereof cut away to show in inner structure.

It will be seen in FIGS. 1 and 7 that an axial section of the oil cooler 100 thus obtained exhibits an honeycomb structure providing a first group of spaces P defined in the stacked respective modules 3, 3' and 3" and a second group of spaces Q defined between respective adjacent pairs of modules. It will be noted that the spaces Q defined in the stack of modules 3, 3' and 3" are communicated with each other in the axial direction of the oil cooler 100 through the axially aligned openings or slots 1h and 2h in the upper and lower plates 1 and 2 of each module and through the axially aligned slots 1k and 2k in the plates 1 and 2 of each module. The uppermost spaces Q are communicated with the outlet ports 5 through the openings 1h in the upper plate 1' of the uppermost module 3', while the lowermost spaces Q are communicated with the inlet ports 7 through the slots 2k in the lower plate 2' of the lowermost module 3". The upper end plate 6 is further provided with two small outlets 5a aligned with the radially innermost slots 1h in the uppermost plate 1', as shown in FIG. 5.

The first and second openings 1c-1 and 1c-2 in the upper plate 1 of each of the modules and the first and second openings 2c-1 and 2c-2 in the lower plate 2 are open to and communicated with the interior space P defined in each module. The collars formed along the first and second openings 2c-1 and 2c-2 of the lower plate of each of the modules, excepting the lowermost module 3", are snugly received in and sealingly connected to the inner peripheral edges of the first and second openings 1c-1 and 1c-2 of the upper plate 1 of a lower module. The lower plate 2' of the lowermost module 3" is not provided with the first and second openings 2c-1 and 2c-2, as described previously. The first and second openings 1c-1 and 1c-2 in the upper plate 1' of the uppermost module 3' are sealingly connected with water inlet and outlet pipes 12 and 12', as best seen in FIG. 7.

The oil cooler 100 is provided with a central through-hole D which is defined by the cooperation of the inner peripheral surfaces of the collars 19 of the lower plates 2 of respective modules 3, 3' and 3". The central through-hole D in the oil cooler is utilized to mount the oil cooler on the engine block 13. For this purpose, the aforementioned hollow bolt 14 extends through the central through-hole D in the oil cooler 100 and has an inner threaded end portion 14a screwed into a threaded hole in the engine block 13. The threaded hole in the engine block 13 forms a part of a lubricant circuit in the engine. The part of the bolt 14 adjacent to the threaded and screwed inner end portion 14a extends through a chamber 13a defined by a recess formed in the surface of the engine block 13. The oil cooler 100 is disposed such that the seal 11 attached to the oil cooler is in sealing engagement with the outer surface of the engine block 13 around the recess which forms the chamber 13a. This chamber 13a forms another part of the lubricant circuit in the engine and is communicated with the oil inlet ports 7 in the lower end plate 8 of the oil cooler 100.

The axially outer end portion 14b is threaded so as to be threadably engaged with the oil filter, as shown in FIG. 1. A flange 14c having a hexagonal outer periphery and an integral lower or axially inner section is formed on the bolt 14a immediately axially inwardly of the threaded outer end portion 14b, as best seen in FIG. 7.

Figure 11:
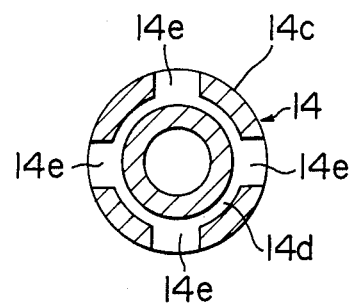
FIG. 11 is a cross-sectional view of the bolt taken along line XI—XI in FIG. 10.
Figure 12:
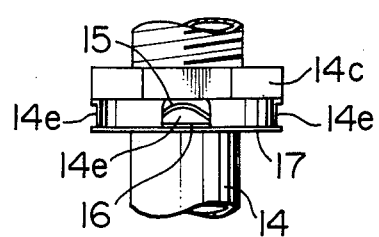
FIG. 12 is a fragmentary side elevation of the bolt.
Figure 13:
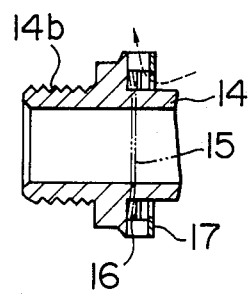
FIG. 13 is a fragmentary axial section of the bolt diagrammatically illustrating the operation of a relief view incorporated into the bolt.

The flange 14c has a bottom face formed therein with an annular groove 14d disposed concentrically with the axis of the bolt 14 and having an inner diameter substantially equal to the outer diameter of the bolt, as shown in FIGS. 9–13. A plurality of radial grooves 14e are also formed in the bottom face of the flange 14c to communicate the annular groove 14d to the outer periphery of the flange 14c, as best seen in FIG. 11. A wave-shaped spring ring 15 and an annular valve plate 16 are disposed in the annular groove 14d in a manner shown in FIG. 12 and retained in the annular groove 14d by an annular valve seat member 17 secured to the bottom face of the flange 14c by an adhesive or spot welding. The spring ring 15 has a shape shown in FIG. 14 and is designed to exert a predetermined spring force to the valve member 16 to resiliently urge the same against the valve seat member 17. The valve member 16 has an inner peripheral edge slidably and substantially sealingly engaged with the outer peripheral surface of that part of the bolt 14 which is surrounded by the annular groove 14d, while the valve seat member 17 has an inner peripheral edge radially outwardly spaced from the outer peripheral surface of the bolt 14, as will be seen in FIG. 13. In the case where the retainer member 17 is secured to the flange by welding, the retainer member should preferably be welded only at several circumferentially spaced points in order to prevent the spring characteristic of the spring member 15 from being damaged by the heat which otherwise would be produced by entire welding.

Figure 15:
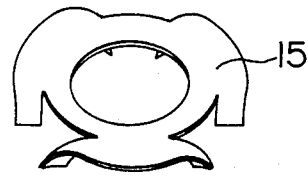
FIG. 15 is a perspective view of a modified spring member.
Figure 14:
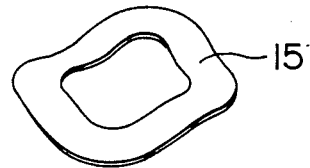
FIG. 14 is a perspective view of a spring member forming a valve member of the relief valve.

The spring member 15 shown in FIG. 14 may be modified to the shape shown in FIG. 15.

The bolt 14 is screwed into the engine block 13 until the bottom face of the valve seat member 17 is brought into face-to-face engagement with the upper surface of the end plate 6 of the oil cooler 100 around the inner peripheral edge of the central opening therein, as best seen in FIG. 7.

The outer diameter of the bolt 14 is smaller than the inner diameter of the central through-hole in the oil cooler 100 to provide an annular bypass passage 20 between the bolt 14 and the oil cooler 100, as best seen in FIG. 1. The bypass passage 20 has an axially inner end always communicated with the chamber 13a so that the valve member 16 is always subjected to the pressure of the lubricant oil in the chamber 13a. Thus, when the oil pressure rises beyond a predetermined pressure level which is determined by the force of the spring member 15, the valve member 16 is moved out of sealing engagement with the retainer member 17 to relieve the oil pressure through the annular groove 14d and the radial grooves 14e, as shown by arrows in FIG. 9, into the oil filter.

The flows of the fluids will be described with reference to FIGS. 7 and 8.

The space P defined in each of the heat exchanger modules 3, 3' and 3" is communicated with the first and second openings 1c-1 and 1c-2 and 2c-1 and 2c-2 in the upper and lower plates 1 and 2 of the module. The space P in each module forms a generally C-shaped passage for water flow which extends from the axially aligned first openings 1c-1 and 2c-1, around the central opeing of the module defined by the collars 18 and 19, and then back to the axially aligned second openings 1c-2 and 2c-2. More particularly, the generally C-shaped water flow passage is divided into a plurality of sub-passages defined between respective circumferential ridges 1f and 2f. In addition, these sub-passages are radially communicated with each other at portions of the circumferential ridges 1f and 2f where the projections 1l and 2l and abutments 1m and 2m are not provided. Accordingly, the water flows in each module in the manner indicated by broken-line arows shown in FIG. 8. It will be noted that the space P in each module is communicated with the space P in an adjacent module only through the first and second openings 1c-1, 1c-2, 2c-1 and 2c-2. It is also to be noted that the flows of water along the generally C-shaped, radially inner and outer sub-passages are subjected to different pressure losses. Thus, the water flows generally zigzag; namely, the water flows radially outwardly at some places and radially inwardly at other places, from a C-shaped sub-passage through spaces between the circumferentially spaced projections 1l and 2l into a radialy adjacent C-shaped sub-passage, as shown by generally radially extending broken-line arrows in FIG. 8.

The space Q defined between each adjacent pair of modules is communicated with the spaces Q in other adjacent pairs of modules through the third and fourth openings 1h, 2h, 1k and 2k formed in the abutments 1m and 2m on the plates 1 and 2 of respective modules. Thus, hot lubricant oil from the engine flows through the inlet ports 7 in the lower end plate 8 and in the seal retainer member 9 and through the axially aligned openings 2k into the axially stacked spaces Q in each of which the oil flows in the circumferentially opposite directions, as indicated by solid-line arrows in FIG. 8. Finally, the oil flows through the opening 1h in the upper plate 1' of the uppermost module 3' and then through the outlet ports 5 and 5a in the upper end plate 6 into the oil filter. It will be noted that, in each of the spaces Q, the oil flows in a circumferential direction generally zigzag, namely, upwardly and then downwardly, as illustrated in FIG. 4A, because the projections 1l in the upper plate 1 of each module are disposed in circumferentially staggered relationship to the projections 2l in the lower plate 2 of the module, and thus recesses under the projections 2 on the lower plate 2 of an upper module 3 are circumferentially staggered relative to recesses above the projections 1 on the upper plate 1 of a lower module, as will be seen in FIG. 4A. This feature is advantageous in that the velocity of the flow of the oil in the spaces Q is increased and the boundary layer of the oil is peeled from the plates 1 and 2 between which the spaces Q are defined, whereby the heat transfer through these plates is improved.

The oil filter is operative to clean the lubricant oil in conventional manner. The oil thus cleaned then flows through the hollow bolt 14 back into the engine block 13.

As will be clear from the foregoing description, the spaces P are separated from the spaces Q by the plates 1 and 2. Thus, the water and hot oil flow through the spaces P and Q in heat exchange relationship, so that the hot oil is cooled and then flows out of the oil cooler 100 into the oil filter while the water absorbs the heat from the hot oil and then flows out of the oil cooler through the water outlet pipe 12'. The staggered arrangement of the upper and lower projections 1l and 2l shown in FIG. 4A increases the heat exchange efficiency for the reasons pointed out above. In addition, the zigzag flow of water discussed above with reference to FIG. 8 is effective to prevent the occurrence of stagnation of water at some places of the spaces P, whereby the heat exchange efficiency is also improved.

In the described embodiment of the invention, the spaces P and Q for the flows of water and lubricant oil are defined between the generally C-shaped ridges formed on the upper and lower plates 1 and 2 of respective modules. However, the shapes of the ridges may alternatively be linear, zigzag or rectangular as seen in plan view. The lubricant inlet into the lowermost space Q and the oil outlet from the uppermost space Q are not limited to the openings 2k in the lowermost plate 2' and to the openings 1h in the upper plate 1' of the uppermost module 3'. The lower plate 2' of the lowermost module 3" may be formed therein with the third openings 2h instead of the fourth openings 2k to form the oil inlet into the lowermost space Q.

The widths of the C-shaped ridges 1f and 2f and the radial distances therebetween are substantially equal in the described and illustrated embodiment of the invention. However, these dimensions and the number of these ridges may be varied to provide the maximum efficiency of the heat exchange between the water and lubricant oil.

It is to be noted that the upper and lower plates 1 and 2 of respective heat exchanger modules 3 can be prepared solely by stamping sheet metal. The upper and lower plates 1 and 2 can be assembled or stacked one above the other without any sealing ring interposed therebetween. As such, the described oil cooler 100 can be manufactured at a reduced cost. None of the heat exchanger modules is provided with inner fins which otherwise would increase the resistance to the flows of water and lubricant oil through the spaces P and Q and cause the problem of deposits of particles between such fins. The described and illustrated structure of the oil cooler 100 provides an increased mechanical strength because all of the axially aligned and abutting projections 1f and 2f, abutments 1m and 2m and the collars 18 and 19 along the central through-hole bear axial load on the oil cooler.

What is claimed is:

1. A heat exchanger comprising a stack of a plurality of generally planar heat exchanger modules each comprising first and second generally planar plates of a good heat conductive material;

each of said first and second plates of each module including an outer peripherial zone raised from a general plane of the plate;

said first second plates of each module being sealingly secured together along their outer peripheral zones;

the adjacent plates of each adjacent pair of modules having portions disposed radially inwardly of the outer peripheral zones of the plates and sealingly secured together;

the plates of the modules being shaped such that a first space for a first heat exchange fluid is defined in each module and such that a second space for a second heat exchange fluid is defined betweeen the adjacent plates of each adjacent pair of modules;

each module being provided with inlet and outlet for said first fluid;

the inlets of said modules being connected with each other for fluid-flow communication with said first spaces in said modules while the outlets of said modules being connected with each other for fluid-flow communication with said first spaces in said modules;

the first and second plates of each module having ridges projecting toward each other from the opposite inner surfaces of the first space in the module to cooperate to define a first passage for the flow of said first fluid in said first space from said inlet to outlet;

each of the ridges on one of the surfaces of each of said first and second plates of each module providing a groove in the other surface of the plate so that grooves are formed in the opposite inner surfaces of each of the second spaces to cooperate together to define a second passage for the flow of said second fluid;

the ridges and grooves formed on and in each plate providing increased heat exchange surface areas for said first and second fluids;

each of said ridges being formed thereon with a plurality of projections extending into said first space and spaced from each other to cause turbulence in the flow of said first fluid in said first passage; and the ridges of said first and second plates of each module being disposed in substantially indentical pattern;

the ridges on the first plate of each module being respectively aligned with the ridges on the second plate of the module in the direction of the thickness of the module;

some of the ridges with extend into said first space in each module from the opposite inner surfaces thereof being substantially arcuate and extending in the circumferential direction of and substantially concentrically with respect to an axis to cooperate together to define substantially parallel and arcuate sub-passages extending circumferentially of said axis and spaced from each other radially thereof;

said some ridges on each of said plates being formed thereon with projections extending axialy of said axis into an associated first space, the projections extending from each of said some ridges being spaced circumferentially of said axis whereby said arcuate sub-passages are communicated with each other inthe radial direction os said axis through spaces defined between the circumferentially spaced projections on said some ridges to allow said first fluid to flow radially of said axis from a sub-passage in said first space to a radially adjacent sub-passage therein; and the projections formed on the adjacent plates of each adjacent pair of modules provinding recesses in the opposite inner surfaces of the second space defined between said adjacent plates, said recesses being staggered in the circumferential direction of said axis to cause said second fluid to flow in each of said second spaces in the substantially circumferential direction of said axis and generally zigzag.

2. A heat exchanger according to caim 1, wherein said first and second plates of each module are formed by stamped sheets of a metal.

3. A heat exchanger according to claim 2, wherein each of the aligned pair of ridges is formed thereon with abutments projecting from the ridge into said first space and spaced in the direction of the length of the ridge, each abutment on one of the aligned pair of ridges is disposed in abutting engagement with one of the abutments on the other ridge, at least two pairs of the abutting abutments are formed therein with aligned and communicated openings sealed from the first space in each module, and the second spaces defined between respective modules are communicated through said aligned and communicated openings in the first and second plates of respective modules to form a passage for said second fluid.

4. A heat exchanger according to claim 3, wherein said first fluid inlet and outlet are formed in the first and second plates of all modules excepting the outer plate of one of the outermost modules, the first fluid inlet and outlet in the outer plate of the other of the outermost modules being connected with inlet and outlet pipes for said first fluid.

5. A heat exchanger according to claim 3, further including end plates sealingly secured to the outer plates of the outermost modules, the end plate secured to said outer plate of said one outermost module being formed therein with at least one inlet port for said second fluid, the end plate secured to the outer plate of the other outermost module being formed therein with at least one outlet port for said second fluid and designed to sealingly and detachably connected with a filter for cleaning said second fluid, said inlet port being communicated with said aligned and communicated openings in the first and second plates of said one outermost module, said outlet port being communicated with the aligned and communicated openings in the first and second plates of the other outermost module.

6. A heat exchanger according to claim 5, further including means for sealingly connecting the end plate secured to said one outermost module to a source of said second fluid.

7. A heat exchanger according to claim 6, further including means securing said stack of heat exchanger modules and said end plates to said source of said second fluid, and wherein said stack of heat exchanger modules and said end plates are formed therein with a throug-hole substantially coaxial with said axis and extending in the direction of the thickness of said stack of modules, said through-hole being separated from said first and second spaces in said stack of modules and having one end to be always communicated, in use, with said source of said second fluid, and wherein said securing means comprises a bolt designed to extend, in use, through said through-hole into said source of second fluid, said through-hole and said bolt being dimensioned to define therebetween a bypass passage for said second fluid, said bypass passage having an end open in said end plate secured to said one outermost module, and wherein said bolt includes a valve means responsive to the pressure in said second fluid in said bypass passage to permit said second fluid to flow through said bypass passage into said filter.

8. A heat exchanger according to claim 7, wherein said bolt is hollow to define therein a return passage for said second fluid from said filter into said source of said second fluid.

9. A heat exchanger according to claim 8, wherein said bolt has a flange having a aradially extending face directed toward said stack of heat exchanger modules and an outer peripheral surface to be exposed, in use, to the space in said filter which is communicated with said second fluid outlet port in said end plate secured to said the other outermost module, said face of said flange being formed therein with a groove open in said outer peripheral surfaace of said flange, and wherein said valve means comprise a valve seat member secured to said axially directed face of said flange and disposed, in use, in sealing engagement with said end plate secured to said the other outermost module, said valve seat member defining an opening communicated with said bypass passage, a valve member movable in said groove in the axial direction of said bolt into and away from said valve seat member, and means resiliently biasing said valve member against said valve seat member to normally close said opening in said valve seat member.

* * * * *